(12) United States Patent
Upadrasta

(10) Patent No.: US 6,771,594 B1
(45) Date of Patent: Aug. 3, 2004

(54) RELIABLE/NON-RELIABLE TRANSMISSION OF VOICE USING TCP/UDP BASED ON NETWORK QUALITY OF SERVICE

(75) Inventor: Prasad V. Upadrasta, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 1231 days.

(21) Appl. No.: 08/829,587

(22) Filed: Mar. 31, 1997

(51) Int. Cl.⁷ .............................................. H04M 12/26
(52) U.S. Cl. ........................ 370/228; 370/252; 370/468
(58) Field of Search ................................ 370/252, 253, 370/400, 401, 465, 466, 468, 392, 228

(56) References Cited

U.S. PATENT DOCUMENTS

| | | | | |
|---|---|---|---|---|
| 5,115,429 A | * | 5/1992 | Hluchyj et al. | 370/420 |
| 5,153,877 A | * | 10/1992 | Esaki et al. | 370/389 |
| 5,367,523 A | * | 11/1994 | Chang et al. | 370/235 |
| 5,430,727 A | * | 7/1995 | Callon | 370/401 |
| 5,461,611 A | * | 10/1995 | Drake, Jr. et al. | 370/420 |
| 5,488,609 A | * | 1/1996 | Hluchyj et al. | 370/420 |
| 5,742,772 A | * | 4/1998 | Sreenan | 370/401 |
| 5,896,372 A | * | 4/1999 | Auerbach et al. | 370/282 |

* cited by examiner

Primary Examiner—Hassan Kizou
(74) Attorney, Agent, or Firm—Blakely, Sokoloff, Taylor & Zafman LLP

(57) ABSTRACT

A system to increase reliability of realtime data communications by determining the quality of network service. If the quality of service falls below a threshold, the realtime data is routed through a reliable network service such as TCP. If quality of service is adequate, data is routed through a non-reliable network service such as UDP, which maintains the realtime nature upon data playback in the case of audio or video realtime data. When audio or video data is routed through TCP rather than UDP, the data is buffered and sequenced before playback resulting in a slightly delayed, but more reliable output.

17 Claims, 8 Drawing Sheets

RELIABLE/NON-RELIABLE TRANSMISSION OF VOICE USING TCP/UDP BASED ON NETWORK QUALITY OF SERVICE

BACKGROUND OF THE INVENTION

1. Field of the Invention

The invention relates generally to the field of communications systems. More specifically, the invention relates to protocols for data networking.

2. Description of Related Art

In communications networks utilizing Internet Protocol (IP), real-time data, such as audio and/or video (A/V) data, is typically transmitted using the User Datagram Protocol (UDP). UDP is referred to as a "non-reliable" protocol since data "packets" lost during transmission are not retried or re-transmitted. If lost UDP data packets were re-transmitted at a later instant in time, the resulting A/V playback may be jumbled with frames of video or audio out of order. Retransmission or retries destroys the proper sequencing of audio and video information that is desired for audio and video transmissions, especially in videoconferencing or teleconferencing sessions. When the amount of packet loss is not too severe, A/V playback may pop or jitter with lost packets but will be audible and viewable. However, when the packet loss is too severe, the result may be inaudible, or confusing to the point where the afflicted recipient may prefer a delayed or semi-realtime transmission as a substitute for a severely degraded realtime transmission.

By contrast, Transmission Control Protocol (TCP), which also runs over IP, is a "reliable" protocol in that data packets are "guaranteed" to eventually reach their destination. The packets are numbered and sequenced when first transmitted so that upon a retry or retransmission, the packets can be ordered correctly. TCP is normally utilized for text binary file transfer and for transferring control messages which do not ordinarily need realtime transfer, and wherein it is important that transmitted packets eventually be received at their intended destination. The amount of packet loss for TCP packets is less critical than for UDP packets, since TCP is retry capable. If voice and A/V data were transmitted over TCP, the resulting realtime playback might be chaotic and out-of-order, especially where the quality of the network connection or routing is poor, since lost packets would be retried and arrive out-of-order.

Thus, there is a need to provide a mechanism which can reliably transmit A/V and other realtime data even when network connections are poor.

SUMMARY

The invention provides a method and apparatus for increasing the reliability of data communications based on network quality of service. The quality of service is determined to be inadequate based upon a certain threshold. If the quality of service is inadequate, data is routed through a reliable communications service.

BRIEF DESCRIPTION OF THE DRAWINGS

The objects, features and advantages of the method and apparatus for the present invention will be apparent from the following description in which.

DETAILED DESCRIPTION OF THE INVENTION

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Figure 1:
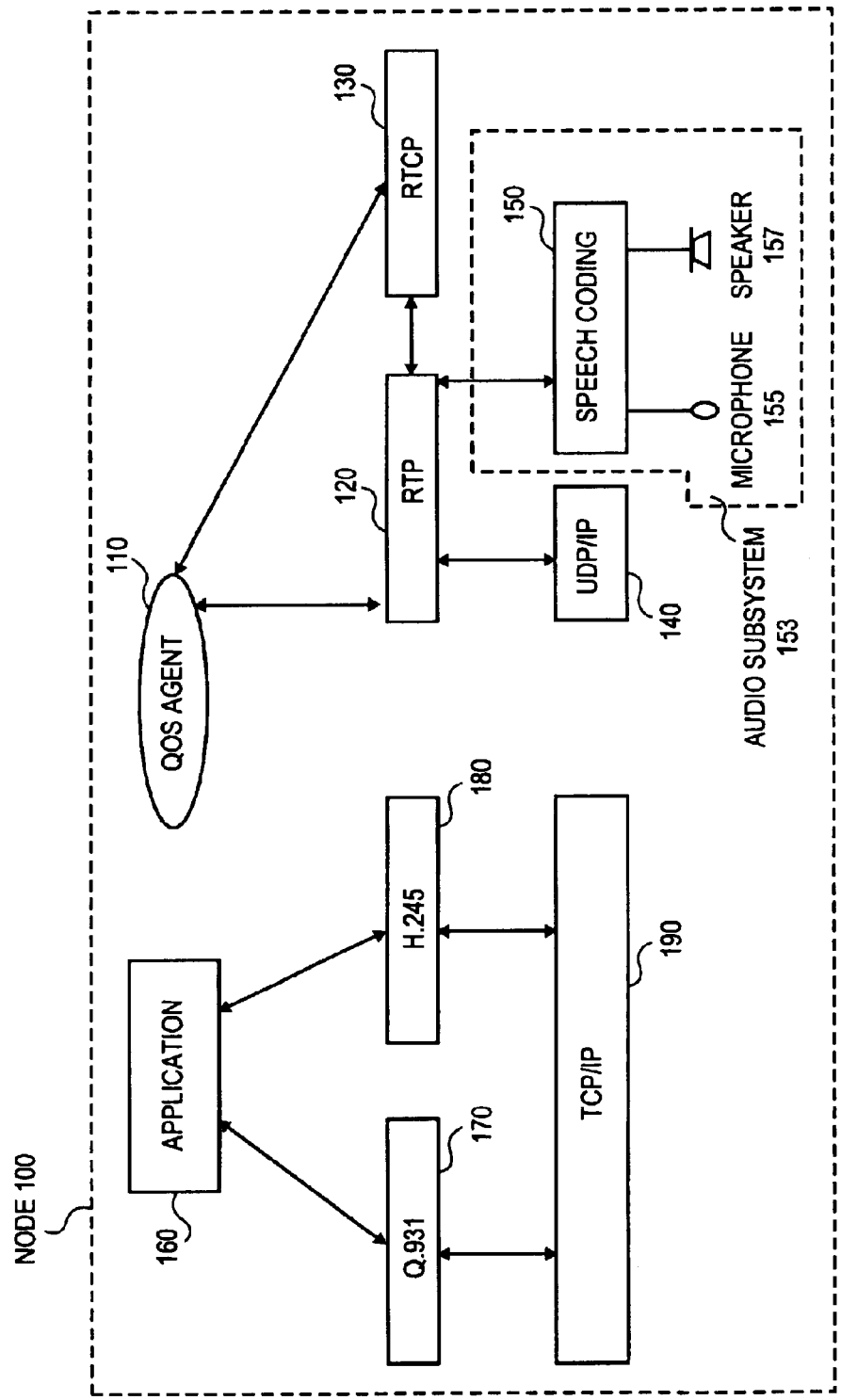
FIG. 1 shows a first embodiment of the invention employed in audio communication.

FIG. 1 shows a first embodiment of the invention employed in audio communication.

FIG. 1 shows a node 100 according to an embodiment of the invention that communicates data through a network. As mentioned in the background, networks capable of communicating over IP can transmit/receive data packets using two different network services—a reliable network service TCP and a non-reliable network service UDP. The embodiment shown exemplifies components for audio data communication such as in an internet voice call using H.323 specification (ITU Recommendation H.323 (Published May 28, 1996): "Line Transmission of Non-Telephone Signals—Visual Telephone Systems and Equipment for Local Area Networks Which Provide a Non-Guaranteed Quality of Service"). Ordinarily, audio, such as voice is communicated using UDP and not TCP.

However, the invention in the embodiment of FIG. 1 shows a system which provides a quality of service (QOS) agent 110 which facilitates bi-modal voice/audio communications using both UDP and TCP. QOS agent 110 is coupled to an application interface 160 which is an application to provide a user interface for call establishment and call release, such as Intel Internet Phone™, a product of Intel Corporation. The application interface 160 is coupled to a data transmission manager 165 which includes Q.931 (ITU Recommendation Q.931 (published March, 1993): "Digital Subscriber Signaling System No. 1 Network Layer—Digital Subscriber Signaling System No. 1 (DSS 1)—ISDN User-Network Interface Layer 3 Specification for Basic Call Control") layer 170 and an H.245 (ITU Recommendation H.245 (Published Jun. 4, 1996): "Line Transmission of Non-Telephone Signals—Control Protocol for Multimedia Communication") layer 180. Both Q.931 layer 170 and H.245 layer 180 perform services facilitating any communication utilizing TCP/IP layer 190 which is a representation of TCP running over IP. Q.931 layer 170 performs the call establishment procedure. Q.931 also provides a means to transfer user data in "user-to-user" data messages. User-to-user data is distinguished from "control" data in that userto-user data contains information which one user or node desires another to receive. Control data is information/headers which is used by the nodes to perform call establishment, call release, user notification of incoming calls etc. Since control data is vital to maintaining and establishing the connection between nodes, the TCP/IP layer 190, which is a reliable communication protocol, is utilized to send control data. H.245 layer 180, which is coupled to TCP/IP layer 190, performs capability negotiation and exchange where the communicating nodes can inform one another of what speech codecs, video codecs etc. they are capable of performing.

The QOS agent 110 is directly coupled also to two service layers, a Real Time Protocol (RTP) 120 and a Real Time Control Protocol (RTCP) 130. RTP 120 arranges and sequences data, whether user-to-user or control into units called "packets." Each packet contains header information in addition to the actual data (see FIG. 4 and associated description). RTCP 130 is a compiler of statistics regarding packet loss and is thus, coupled directly to RTP 120 as well. RTCP 130 essentially counts the number of packets received and checks how many packets are lost and delayed. RTCP and RTP are well-defined protocols and are well-known in the art. RTP 120 sends/receives compressed voice data to/from a speech coding system 150 by arranging data in packets when sent and disassembling packets into data when received. RTP 120 is also coupled directly to the UDP/IP layer 140 which facilitates communication utilizing IP, but by way of UDP packets rather than TCP.

Speech coding system 150 is coupled to a speaker 157, capable of transforming an electrical signal into sound waves and a microphone 155 capable of transforming sound waves into an electrical signal. Using "codecs" (compression/decompression algorithms), such as G723 (ITU-T Recommendation G.723.1 (1995): "Dual Rate Speech Codec for Multimedia Telecommunications Transmitting at 6.4 and 5.3 kbit/s") or GSM (GSM06.01 European Telecommunication Standard ETS300-580-1 (September 1994): Full Rate Speech Processing Functions"), which are well known in the art, speech coding system 150 compresses data from microphone 155 and Decompresses data received from RTP 120 into a full electrical signal which speaker 157 can transform and play.

The operation of this embodiment of the invention will be explained by describing an exemplary networked voice call from a node referred to as the "caller" (the user requesting a connection) to another node referred to as the "callee" (the user being requested). Assuming that each node has approximately the structure/capabilities of node 100 of FIG. 1, the invention operates as follows:

The Q931 layer 170 (on the caller node) sends a message to the callee's Q.931 layer 170 requesting that a connection be set-up. The callee then responds with a ring tone on the callee node and sends a message to the caller indicating the user has not yet picked up the call, but has been contacted (by the ring tone). When the user or node picks up the call, the Q.931 layer 170 of the callee sends another message indicating a connect.

A connection is established, but now H.245 layer 180 intervenes to perform capability exchange and negotiation. The H.245 layer 180 of the caller will indicate the node's capabilities, such as having G723 voice compression capability. The callee will, for instance, reply the same or similar capability, allowing the session to use G723. As part of one embodiment of the invention, the existence and buffer size (detailed below) of the QOS (quality of service) bi-modal capability can be communicated. Once the initial Q.931 and H.245 handshaking is complete ordinarily using TCP/IP layer 190 of both caller and callee, the voice (user-to-user data) can be communicated.

The audio subsystem 153 includes speech coding system 150, speaker 157 and microphone 155. When either node receives packets of user-to-user data such as audio, in non-QOS prior art systems, the packets are automatically decoded as UDP packets when received by RTP 120. When received by a node through UDP/IP layer 140, UDP data packets are accepted by RTP 120 which then strips any headers and sends raw user-to-user data to speech coding system 150 which decompresses the data (according to codecs agreed upon) and sends it to speaker 157 for output. Contemporaneously, RTCP 130, from RTP 120, analyzes header information to determine how many packets were received and how many packets were lost during transmission (such as packet numbers, start packet number, etc.). RTCP 130 uses packet headers and other timing information to calculate a rate of packet loss. The rate of packet loss is sent to QOS agent 110 which, in one embodiment, compares the rate to a predefined threshold.

If the rate of packet loss is greater than the threshold, then the QOS agent can either direct a change in node or query the user to authorize one. If the rate is below the acceptable threshold, no action is taken and voice continues to be communicated using the non-reliable UDP. However, the software can be configured to allow the user to enter the change in node independent of statistics or the QOS agent.

According to the invention, ordinarily, voice data will be sent/received in UDP packets, which is the non-reliable (first) mode of communication. The second, reliable mode of communication utilizes a buffering system and TCP packets rather than UDP. In this second "walkie/talkie" mode, compressed voice data is packaged by RTP 120 into reliable mode packets over TCP/IP layer 190 and decoded as such at the receiving node.

Since TCP is a "reliable" network service, guaranteeing delivery of packets, it is desirable that the order of packets be guaranteed before playback. Thus, in the second, reliable mode, TCP packets containing compressed audio data will be communicated between caller and callee. If a particular packet is lost over the network and does not reach the node intended, according to TCP specifications, the packet will later be retried until it does reach its intended destination with an "acknowledgment" in return.

For audio, which in a voice call is intended to be realtime, the correct ordering of data is of some importance. Thus, QOS agent 110 has a buffering system which collects TCP packets received from the network and orders them according to their assigned packet number. The buffering system collects packets until specified number of packets N have been accumulated. The value of N can be specified and agreed upon as part of the H.245 capability exchange procedure. If one node has a greater buffering capability than the other, the number N may be agreed upon as the lower of the two. When N packets have been collected, QOS agent 110 sends the data to RTP 120. RTP 120 removes headers from the packets and sends data to audio sub-system 153, as described earlier, for decompression and playback.

The result in reliable mode is non-realtime voice playback, where the playback is delayed slightly from a realtime playback. A user may prefer, due to the inadequate or poor connection, to receive delayed audio rather than garbled audio or audio missing significant amounts of data.

By switching to the reliable mode and buffering the data packets, a delayed but more complete copy of the user-touser data is available. When the connection enters the reliable mode, all nodes in the network should also switch to the reliable mode, such that they are all using TCP for audio. This can be achieved by sending to other nodes a "Go To Reliable Mode" control message as described below. Packets, when being transmitted from one node to another do not need buffering on the transmit side, but should utilize TCP while the connection is in the second mode. The "reliability" of TCP to guaranteed delivery of packets will result in a better quality voice playback even if not quite realtime. The choice to enter the walkie-talkie (reliable) mode can be via a user input or automatic. As shall be described in other embodiments, when several types of data streams are being communicated, such as video and audio, the streams may be separately routed through either the reliable mode or non-reliable mode, with any or all of the streams routed to reliable mode.

Figure 2:
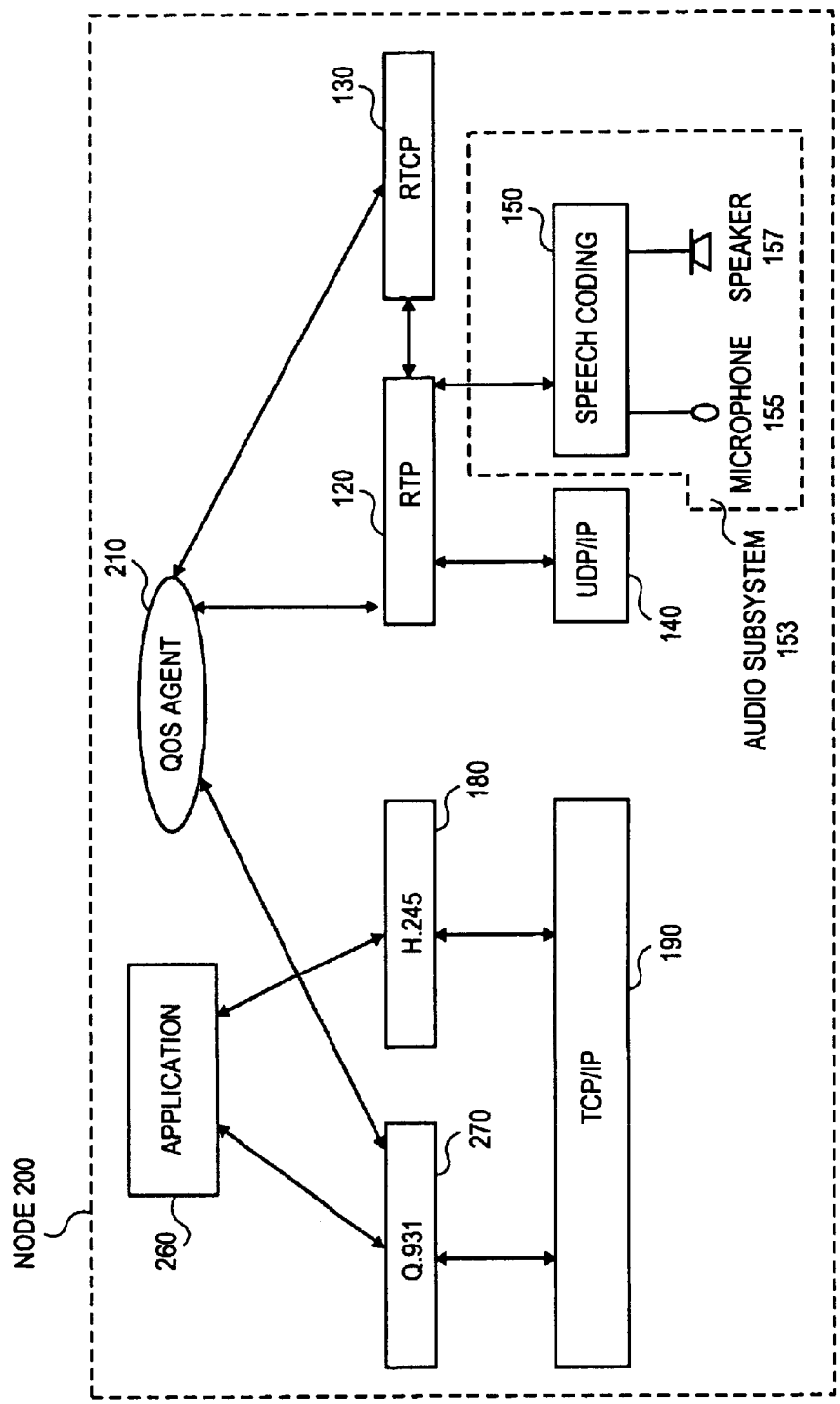
FIG. 2 shows a second embodiment of the invention.

FIG. 2 shows a second embodiment of the invention.

In this embodiment, all elements with identical reference numbers to FIG. 1 operate in a like fashion to that described above. QOS agent 210, shown in node 200 of FIG. 2, is similar to QOS agent 110 of FIG. 1, except that it is not coupled directly to the application interface and can route packets directly to Q.931 layer 270. Additionally, Q.931 layer 270 can route packets directly to QOS agent 210 bypassing application interface 260. In this embodiment, the application interface 260 does not need to be modified from prior art systems, since the QOS agent is detached from its operation.

Figure 3:
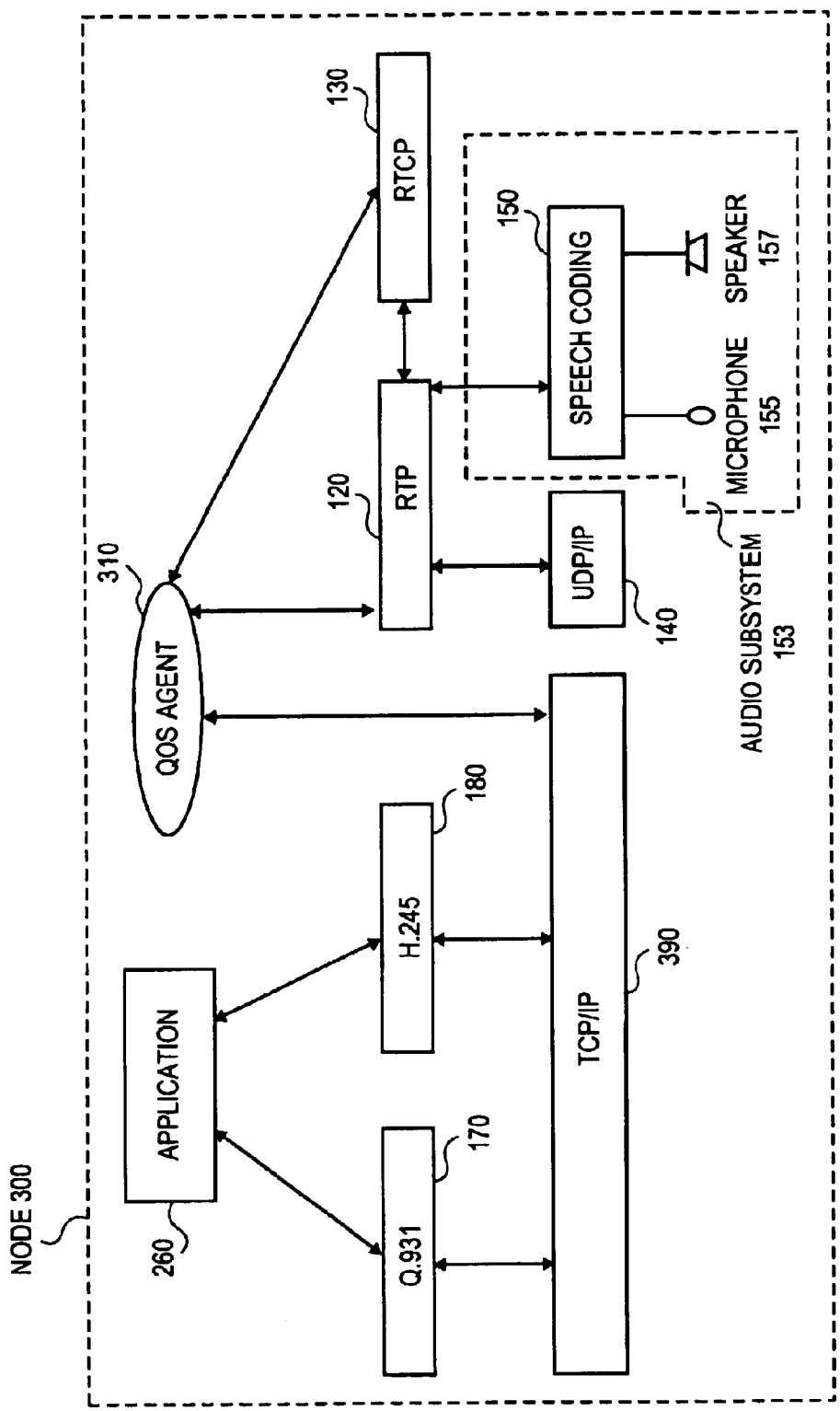
FIG. 3 shows a third embodiment of the invention.

FIG. 3 shows a third embodiment of the invention. In node 300 of FIG. 3, all elements with identical reference numbers to FIGS. 1 and 2 operate in a like fashion to that described above. QOS agent 310, shown in FIG. 3, is similar to QOS agent 110 of FIG. 1, except that QOS agent 310 directly re-routes data to the TCP "port" which is provided for the node on a TCP/IP layer 390. The Q.931 layer 170 and application interface 260 are bypassed as QOS agent 310 is coupled directly to TCP/IP layer 390. Since the QOS agent 310 directly routes data packets to the TCP/IP layer, the application interface 260 and Q.931 layer 170 do not need modification and can operate seamlessly with the invention with no change from the prior art. QOS agent 310 can open a TCP port and route packets to/from RTP 120.

Figure 4:
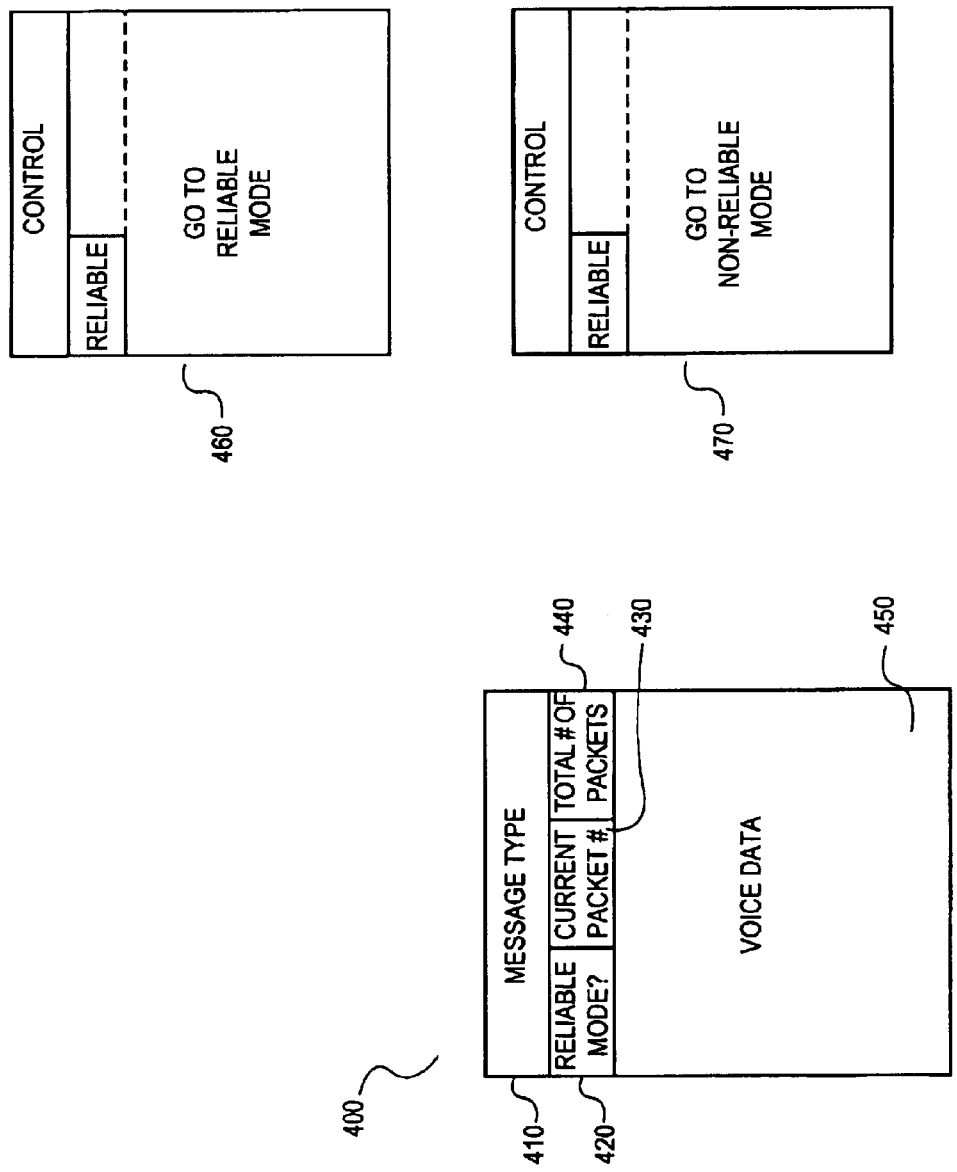
FIG. 4 shows the format of a packet.

FIG. 4 shows the format of various packets communicated from node to node according to the various embodiments of the invention.

A packet 400 will have a message type field 410, which will indicate whether the packet is of a user-to-user data message or a control data message type. The next field 420, will indicate whether the packet is a reliable mode packet or a non-reliable mode packet. A control data message is typically sent as a reliable mode packet since control data are of importance in securing and controlling the network connection. The next field 430 and 440 show the current packet number and the total number of packets, respectively. Finally, in field 450, the actual voice or other user data is copied. Many other fields are possible and have not been shown so as not to obscure the invention. Relevant to the invention are the fields 420 and 430 which identify the type of message and mode of communication (reliable or non-reliable) and fields 430 and 440 which aid the RTCP to compile statistics regarding packet loss and provide sequencing information for the QOS agent when forced to reliable mode. Two separate control message types, peculiar to the invention, may facilitate the change in mode from reliable to non-reliable or vice-versa. A "Go To Reliable Mode" message 460 can be sent by one of the nodes to instruct the other node(s) to accept packets via the QOS agent. Likewise a "Go To Non-Reliable Mode" message 470 can be sent to return the connection to a non-reliable mode when network conditions have improved or when the user so desires. Messages 460 and 470 are shown as reliable mode message which are also control messages. Thus, they will be routed via TCP. The addition of reliable mode fields, such as field 420 of message 400, according to the invention may be achieved by either the QOS agent or the RTP layer. FIG. 4 does not show the layering of these packets into TCP and then encapsulation into IP, both of which are well known in the art. The use of the field 420 and message types 460 and 470 are thus transparent to the TCP/IP layer and require no change in that layer under current practice.

Figure 5:
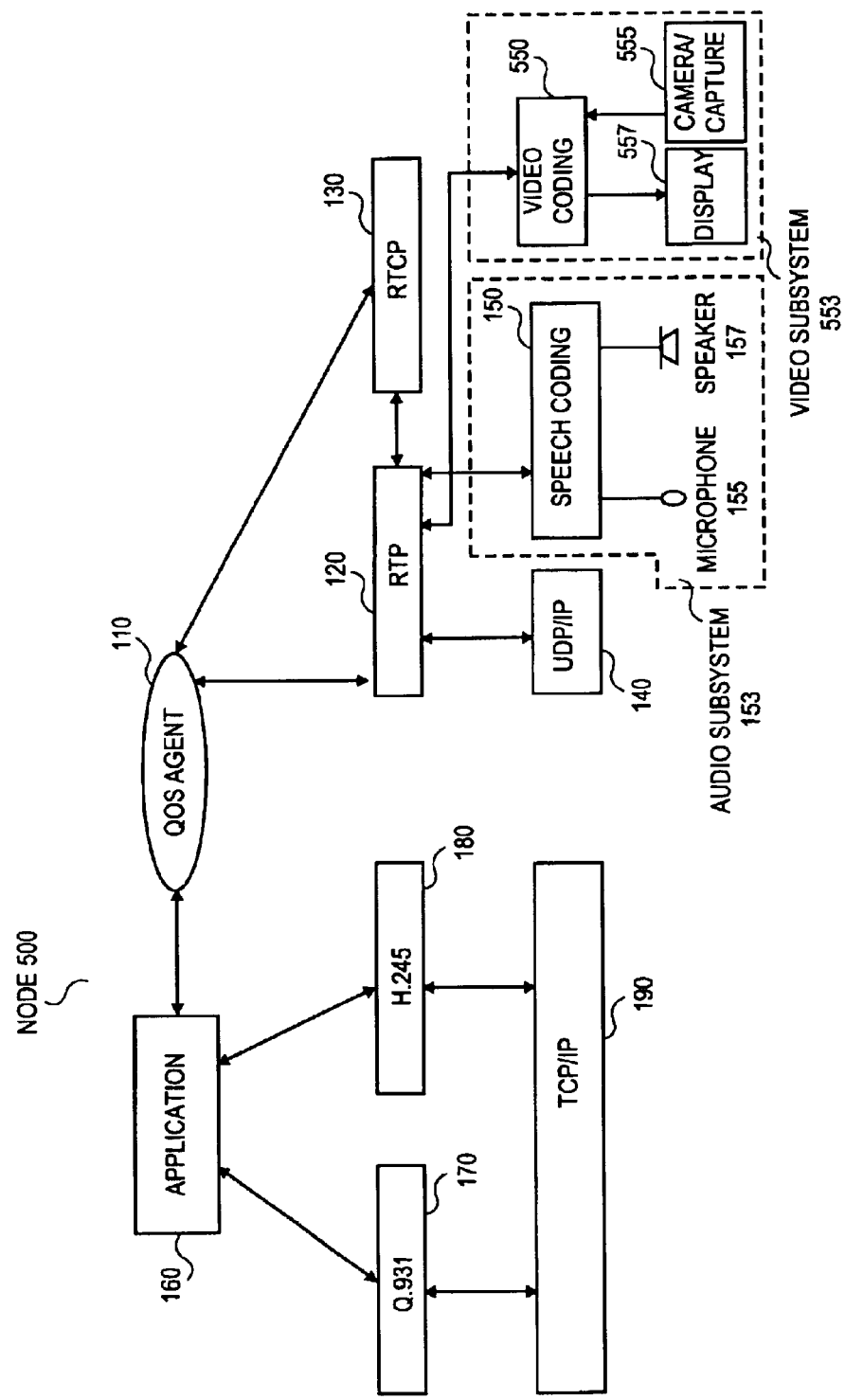
FIG. 5 shows another embodiment of the invention having several types of data streams.

FIG. 5 shows another embodiment of the invention having several types of data streams.

In node 500 of FIG. 5, all elements with identical reference numbers to FIG. 1 and 2 operate in a like fashion to that described above. Node 500 shown in FIG. 5 has the capability of videoconferencing with the addition of a video subsystem 553. Video subsystem 553 includes video coding interface 550 which is capable of processing video codecs and is coupled to a display 557 and camera/capture device 555. Not shown are other components such as a video controller/adapter which may also be needed to output video on display 557.

During a videoconferencing communication session, both video and audio data may be communicated. Since the data streams may be separate and may involve different codecs, ordinary practice involves encapsulating and packetizing the video and audio streams separately. Thus, according to another embodiment of the invention, video streams originating from video coding system 550 (images received by camera/capture device 555) can be routed via TCP (in reliable mode), while the audio stream can be routed via UDP. Thus, packets of each stream type can be separately communicated in either reliable or non-reliable mode. If the user desires the video to be clear, but not necessarily real-time, a reliable mode buffering operation will occur via the QOS agent such that a certain number of packets are collected prior to video playback. RTCP 130 can be configured to compile statistics for each type of stream separately. By placing audio and video into modes independent of the other, a user's preference can be more easily accommodated. In situations where files (binary or text) are being communicated, as well as audio and video, these streams will be sent via TCP, but on a different port, such as the FTP (file transfer protocol) or Telnet ports. Although the node embodiment of FIG. 1 is shown in FIG. 5, any combination of other embodiments may be employed to carry out reliable mode video conferencing.

Figure 6:
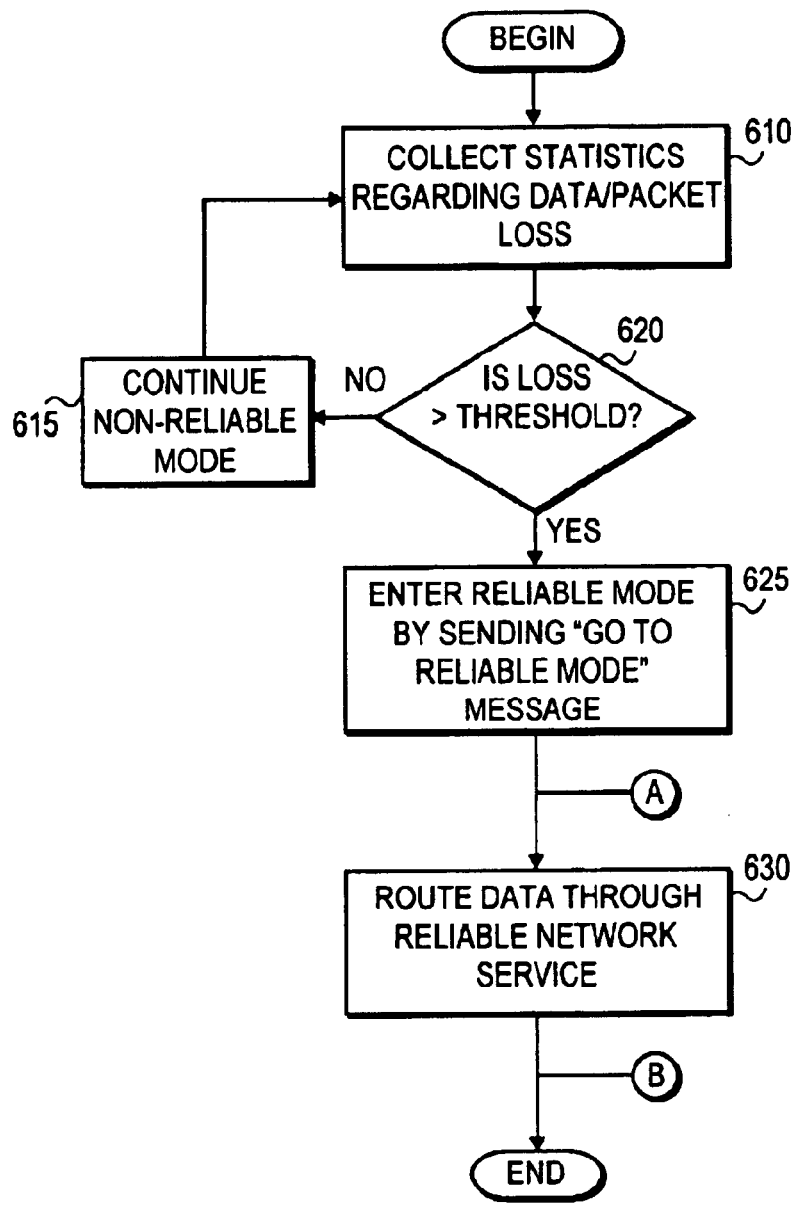
FIG. 6 is a flow diagram of an embodiment of the invention.

FIG. 6 is a flow diagram of an embodiment of the invention. The system, through the RTCP, is continuously compiling statistics regarding data or packet loss, particularly, in terms of number of packets lost per a certain unit of time. These statistics are collected (step 610) and then sent to the QOS agent or interface for comparison. If the data loss is greater than a certain threshold (checked at step 620), which may be user-defined or application defined and may vary from time to time due to many network conditions, then the reliable mode is entered into (step 625) by sending a "Go To Reliable Mode" control message to all other nodes. If the loss is not greater than the threshold, then data communication continues in the non-reliable mode (step 615). Next, according to step 630, data is rerouted through a reliable communications service such as TCP. This methodology assumes that the previous mode of communication was mode 1, the non-reliable network service.

Figure 7A:
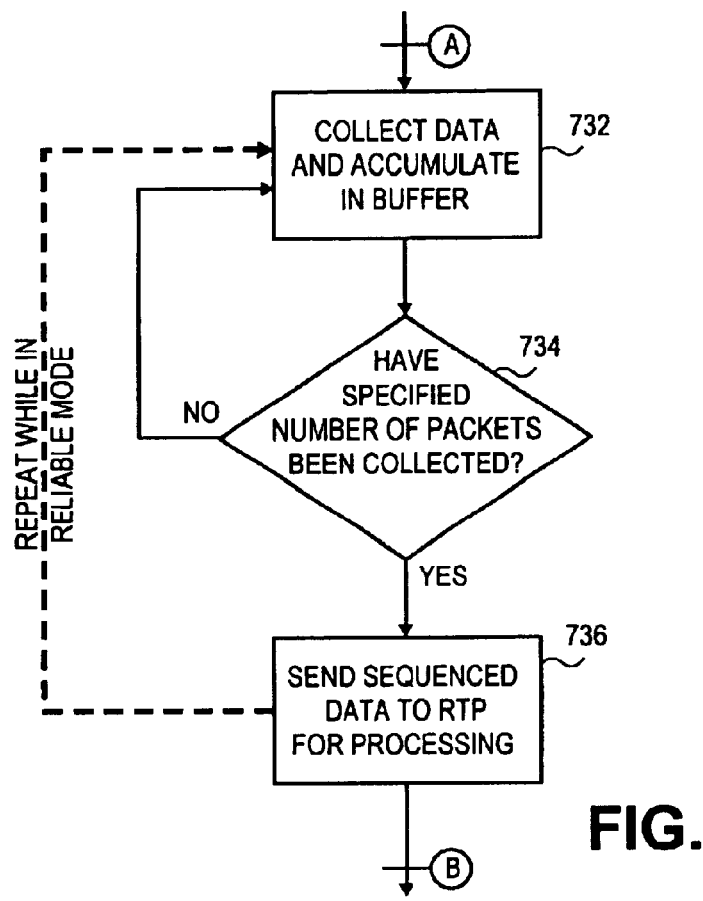
FIG. 7A is a diagram of data routing according to one embodiment of the invention.

FIG. 7A is a diagram of data routing according to one embodiment of the invention. The step of routing data according to step 630 of FIG. 6 has further methodology as indicated in FIG. 7A. Data packets are collected and buffered until a specified number of packets have been accumulated as shown in step 732. The time will vary depending on the network conditions, user or application preference and may also be defined in terms of time elapsed rather than number of packets. When the specified number of packets have been collected (or the buffer filled) (checked at step 734), the packet collection discontinues for a brief instant. The sequenced packet data is then sent, in order, to the RTP or other depacketization layer for processing (step 736). The collecting and buffering of packets repeats continuously, while the reliable mode is operative.

Figure 7B:
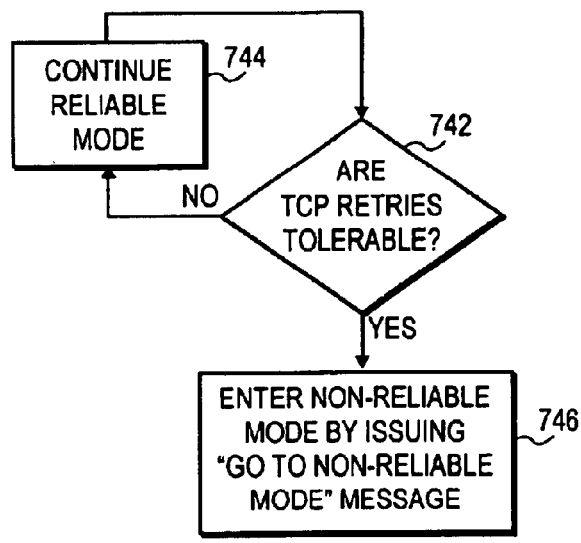
FIG. 7B is a flow diagram of re-entry into non-reliable mode while in the reliable mode.

FIG. 7B is a flow diagram of re-entry into non-reliable mode while in the reliable mode. In a reliable network service such as TCP, the quality of service can be checked by measuring the number of TCP retries. If the number of TCP retries is tolerable (checked at step 742), then the quality of network conditions (service) is adequate. Thus, according to step 744, the non-reliable mode is re-entered into by issuing, for instance, a "Go To Non-Reliable Mode" control message (step 746). If the TCP retries are not at a tolerable level, then the system continues in the reliable mode, thereby guaranteeing packet delivery (step 744).

Figure 8:
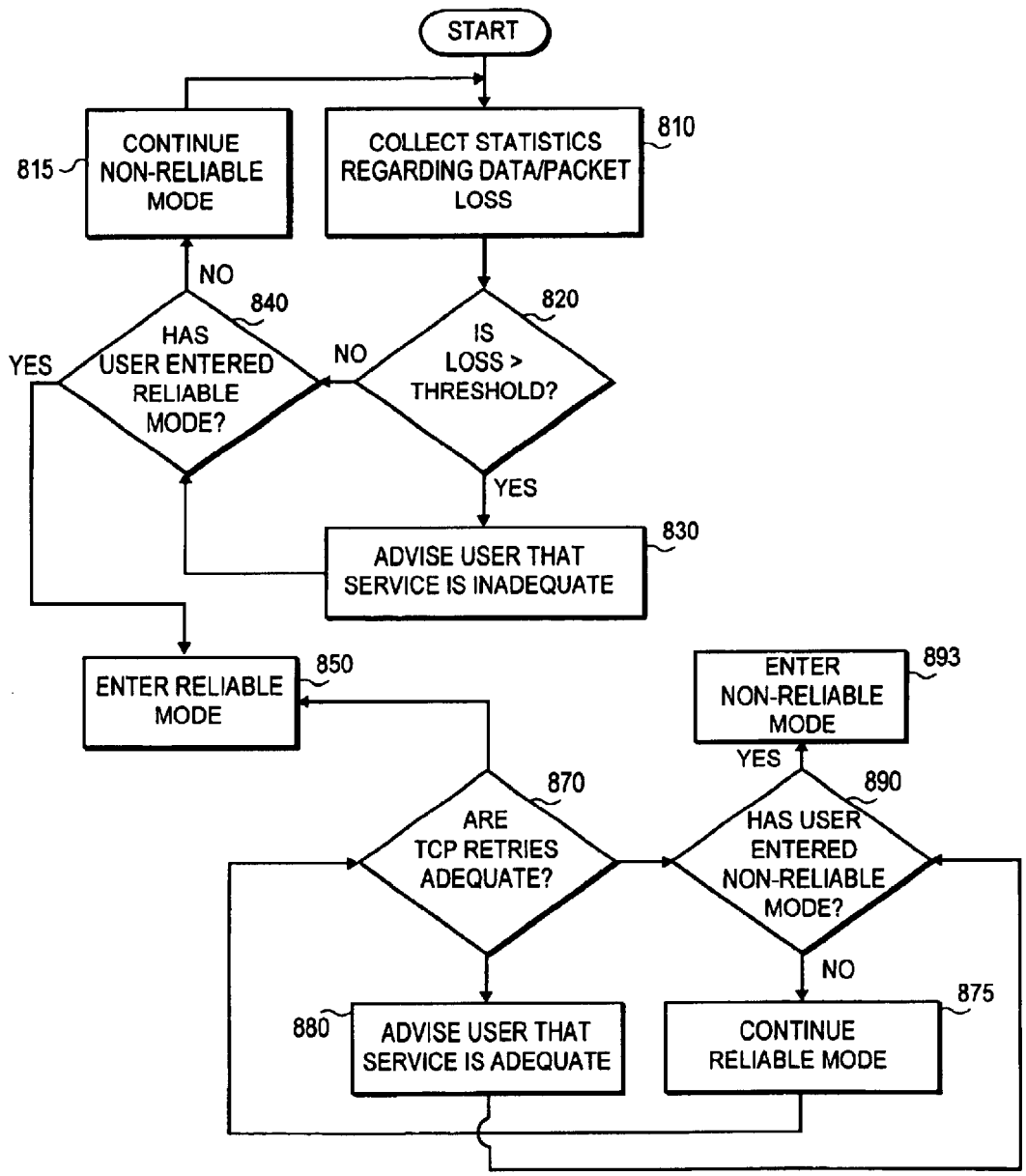
FIG. 8 is a flow diagram of another embodiment of the invention.

FIG. 8 is a flow diagram of another embodiment of the invention. The data (packet) loss statistics are first collected (step 810). Then, the statistics are sent to be compared using a QOS agent or similar mechanism (step 820). If the loss exceeds a threshold amount, the user is advised that network service is inadequate (step 830). If the loss is less than threshold, it is advantageous to allow the user to enter, via a keyboard, mouse or other input interface to request that the reliable mode be entered into (checked at step 840). If the reliable mode has not been entered into, communications continue through the non-reliable mode (step 815). The user may desire to enter the reliable or "walkie-talkie" mode even if the system has not yet advised the user of inadequate service. If the user desires a clear connection, and the reliable mode is entered, then the reliable mode is entered (step 850) by sending a "Go To Reliable Model" control message. Then, as described in the various embodiments above, data is now routed through the reliable service. While in the reliable mode, the non-reliable mode can be re-entered if network conditions improve. A user profile can be established indicating the tolerable number of TCP retries and acknowledges. When the TCP statistics (as well as delay in packet receipt by the QOS agent), as measured through the RTP, indicate that the level of TCP retries are tolerable (checked at step 870), then network conditions will be deemed to have improved and the non-reliable mode can be re-entered. The user is then advised that network service is adequate (step 880). According to step 890, the system checks for the user to enter the non-reliable mode (accomplished at step 893). If not, the reliable mode is continued (step 895). At any time, the user may enter the reliable mode (checked at step 840) or the non-reliable mode (checked at step 890) depending on preference. The various methodologies of FIGS. 6–8 can be extended for each type of realtime data stream communicated.

While the invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. A method for increasing reliability of data communications based on a quality of service of said communications, said method comprising:
   determining if said quality of service is inadequate based upon statistics regarding rate of packet loss during said data communications;
   routing and buffering data communications, if said quality of service is determined to be inadequate, using a reliable network protocol; and
   routing data communications using a non-reliable network protocol if quality of service is determined to be adequate.

2. A method according to claim 1 further comprising:
   collecting packets of data generated by said data communications when said data communications is routed through a reliable network service, said collecting performed to accumulate a defined number of packets prior to said step of processing.

3. A method according to claim 1 wherein said step of routing includes issuing "go to reliable mode" control message.

4. A method according to claim 1 further comprising exchanging between network nodes the capability of each node using route data to a said reliable network protocol.

5. A method according to claim 1 wherein said step of determining if quality of service is adequate includes:
   collecting the statistics regarding rate of packet loss during said data communications; and
   comparing said statistics with a threshold, said comparison yielding a determination that the quality of service is inadequate if the rate of packet loss exceeds said threshold.

6. A method according to claim 1 further comprising advising a user that quality of service is inadequate.

7. A method according to claim 1 wherein a user is capable of initiating the step of routing independent of said determination of quality of service.

8. A system of bi-modal data communication comprising:
   a data transmission manager;
   an application interface coupled to said data transmission manager, said application interface configured to instruct said data transmission manager to route data using a non-reliable network protocol in a first mode of data communication and using a reliable network protocol in a second mode of communication;
   a quality of service agent, coupled to said application interface, said quality of service agent configured to collect data packets from said application interface if said data transmission manager is instructed to route data through a reliable network protocol, said quality of service agent including a buffering system configured to store a specified number of data packets in said first mode; and
   a data communications statistics compiler coupled to said quality of service agent, said compiler, measuring quality of service of data communication according to statistics regarding rate of packet loss during said data communications configured to notify said quality of service agent of inadequate quality of service.

9. A system according to claim 8 wherein said data transmission manager operates as one of a Real Time Protocol (RTP) interface or Q.931.

10. A system according to claim 8 wherein said application interface includes a connection adviser configured to advise a user of inadequate quality of service, said connection adviser configured to accept a user instruction that places said data communication into said first mode.

11. A system according to claim 8 wherein said quality of service agent is configured to switch between said first mode and said second mode depending upon the quality of service.

12. A system according to claim 8 wherein said data is one of audio or video data.

13. A system according to claim 8 wherein said data communication statistics compiler includes the Real Time Control Protocol.

14. A system according to claim 8 wherein said reliable network service is the Transmission Control Protocol.

15. A system according to claim 8 further comprising a capability exchange system, said capability exchange mechanism allowing communicating nodes to identify to each other the capability of each node to route data using a reliable network protocol.

16. A system of bi-modal data communication comprising:

a data transmission manager;

a quality of service agent coupled to said data transmission manager, said quality of service agent configured to collect data packets from said data transmission manager if said data transmission manager is instructed by said quality of service agent to route data using a reliable network protocol, said quality of service agent including a buffering system configured to store a specified number of data packets when using said reliable network protocol; and a data communications statistics compiler coupled to said quality of service agent, said compiler configured to collect statistics regarding rate of packet loss during said data communications and to notify said quality of service agent of inadequate quality of service.

17. In a network, a system of bi-modal data communication comprising:

a quality of service agent coupled to said network, said quality of service agent configured to collect data packets from said network if said quality of service agent routes data using a reliable network protocol, said quality of service agent including a buffering system configured to store a specified number of data packets when using said reliable network protocol; and a data communications statistics compiler coupled to said quality of service agent, said compiler configured to collect statistics regarding rate of packet loss during said data communications and to notify said quality of service agent of inadequate quality of service, said notification triggering said quality of service agent to route data using said reliable network service, otherwise, said quality of service agent configured to route data using a non-reliable network service.

* * * * *